United States Patent Office 2,811,109
Patented Oct. 29, 1957

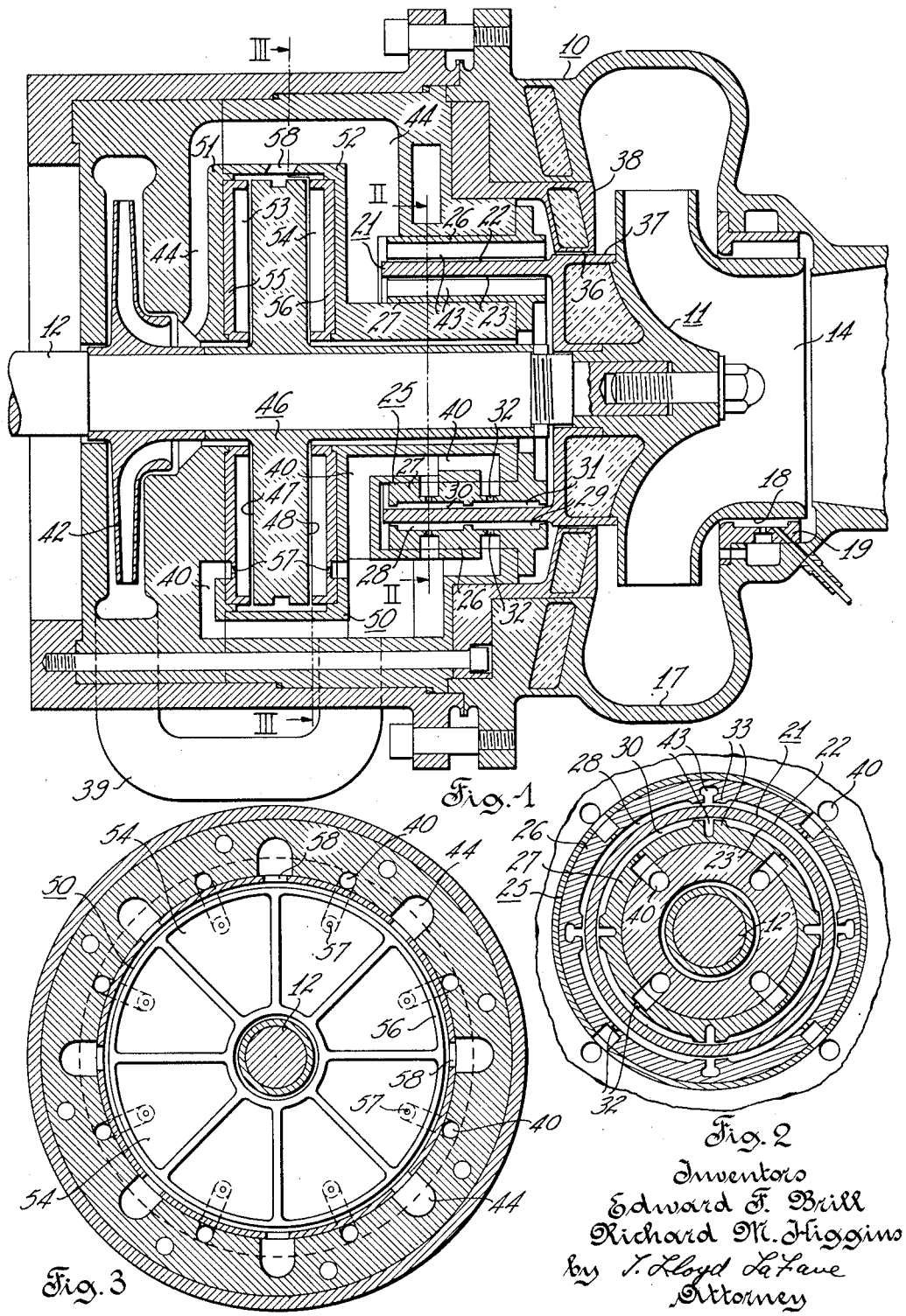

2,811,109

U-SHAPED ANNULAR FLUID PRESSURE BEARING

Edward F. Brill, Brookfield, and Richard M. Higgins, Milwaukee, Wis., assignors to Allis-Chalmers Manufacturing Company, Milwaukee, Wis.

Application September 24, 1954, Serial No. 458,112

7 Claims. (Cl. 103—111)

This invention relates generally to a machine having a rotatable member and bearings associated therewith for maintaining the rotatable member centered and aligned with a given axis of rotation. More particularly the invention relates to the combination of a rotatable member having a flange with fluid pressure bearings on opposite faces of the flange.

Besides maintaining the rotatable member supported, centered and axially aligned, in many apparatus it is desirable to reduce the weight of the rotatable member or shorten the length thereof. According to the present invention, both reduced weight and shortened length are obtained by providing the rotatable member such as a shaft with one or more flanges each having a larger diameter than the rotatable shaft. Because of the larger diameter the flange provides increased bearing surface and can accommodate a greater number of fluid pressure chambers in the stationary bearing in which the flange rotates.

For supporting the rotatable member, the flange comprises a hollow cylinder or tube concentric with the rotatable member and journaled in a U-shaped fluid pressure bearing comprising a plurality of pressure chambers presenting open sides on the outer cylindrical surface of the tube and a plurality of pressure chambers presenting open sides on the inner cylindrical surface of the tube.

In operation, as a portion of the outer periphery of the tube moves toward a pressure chamber and another portion away from another pressure chamber, the corresponding portions of the inner periphery of the tube move away from a pressure chamber and toward another pressure chamber, respectively. The chambers toward which the inner and outer surfaces of the tube move substantially diametrically opposite each other and develop higher pressure and the opposing chambers lower pressure. The high pressure chambers not only act on the tube to restore its bearing surface to a normal equilibrium state and maintain a constant positioning effect thereon but also maintain the tube annular, for the higher pressure on the outside of the tube acts in the same direction as the higher pressure on the inside of the tube.

An object of the present invention is to provide bearing support for a rotatable member permitting reduction in weight of the rotatable bearing element.

Another object of the invention is to shorten the length of a rotatable member required for bearing support.

Another object of the invention is to apply fluid pressure bearings on opposite faces of a flange of a rotatable member to prevent tilting of the rotatable member.

Another object of the invention is to provide a radial bearing for a rotatable tube with the bearing forces distributed for keeping the tube round.

Other objects and advantages will appear from the following description taken with the accompanying drawing, in which:

Fig. 1 is a view in substantially axial cross section of a centrifugal pump showing the preferred embodiment of the invention; that portion of the section above the center line of the shaft shows the discharge passages of the bearings and that portion of the section below the center line of the shaft shows the supply passages of the bearings;

Fig. 2 is a cross sectional view through the fluid bearing behind the impeller along the line II—II in Fig. 1; and Fig. 3 is a cross sectional view to reduced scale through the thrust bearing taken along line III—III of Fig. 1.

Shown in Fig. 1 is a centrifugal pump which may be operated in the vertical or any other position but preferably in the horizontal position as shown. The pump has a casing 10 for containing a working fluid. The rotatable member comprises a shaft 12 carried by the casing 10 for mounting a main impeller 11 for pumping the working fluid. The shaft 12 may be rotated by any conventionally known means (not shown in the drawings). Main impeller 11 has its suction or inlet portion 14 connected with a discharge conduit or volute 17. Impeller 11 presents an annular bearing surface 18 about the periphery of its inlet portion 14.

Means journaling the inlet portion 14 of the impeller 11 in the casing may include a suitable wearing ring mounted in the casing or a fluid piston type bearing 19 mounted in the casing or integral therewith.

Shaft 12 may be hollow or have an end turned back on itself to form a hollow cylinder or an annular thin walled tube or tubular flange 21. Shaft 12, however, is solid, as shown, and flange 21 is cup shaped with the tubular portion disposed concentrically of shaft 12. The flange is suitably secured for rotation with shaft 12. As shown, flange 21 is integral with impeller 11 and extends axially therefrom.

Tubular flange 21 has a cylindrical outer bearing surface 22 and a cylindrical inner bearing surface 23.

A stationary bearing 25 for supporting rotating flange 21 is supported in casing 10 and is annular and of U-shaped axial cross section. The legs 26, 27 of U-shaped bearing 25 define an annulus in which tubular flange 21 rotates. Leg 26 of the U-shaped bearing defines axially spaced apart groups or sets of three or more circumferentially spaced pockets or pressure chambers 28, 29 open to outer cylindrical surface 22 of the tubular flange. The other leg 27 of the U-shaped bearing defines axially spaced apart sets of three or more circumferentially spaced pressure chambers 30, 31 open to inner cylindrical surface 23 of tubular flange 21.

Fluid under pressure is conducted to each of the chambers 28 to 31 through suitable orifices 32 restricting the flow of the fluid to insure a predetermined fluid flow and pressure to each of the chambers. The fluid pressure chambers are defined by lips 33 in close tolerance with the rotating bearing surface of the tubular flange. Fluid supplied to each chamber escapes across the lips of the bearing. Bearing 25 journals the tubular flange 21 of shaft 12 and impeller 11.

The sets of axially spaced pressure chambers 28, 29 on outer cylindrical surface 22 of tubular flange 21 provide not only radial centering of the shaft but also provide forces restoring alignment of the shaft when it tends to tilt.

Similarly, the sets of axially spaced pressure chambers 30, 31 on inner cylindrical surface 23 of flange 21 also provide forces restoring alignment of the shaft and cooperate with pressure chambers 28, 29 to apply the forces restoring alignment to both the inside and the outside of tubular flange 21 to maintain the flange round.

Bearing 25 in providing centering and alignment of the shaft permits running clearance between the annular shoulder 37 of the impeller and the casing 10 to be made small enough so the casing may define or include a sealing ring 38 providing minimum clearance preventing leakage of fluid from volute 17 through the running clearance 36. Fluid pressure bearing 25 also acts as a seal between high pressure volute 17 and the lower pressure area within casing 10.

While fluid under pressure may be supplied to bearing 25 from the discharge of impeller 11, bearing 25 is shown supplied with fluid under pressure through supply ducts 39, 40 from an auxiliary impeller 42 mounted on shaft 12. Fluid discharged from bearing 25 is conducted by discharge passages 43, 44 to the suction side of the auxiliary supply impeller for recirculation through bearing 25. Operating impeller 42 in this closed system permits utilization of fluid having a lower temperature than that of the fluid being pumped by main impeller 11. The fluid pressure on opposite sides of sealing ring 38 at clearance 36 are made substantially equal to prevent exchange of fluid between the circuits of impellers 42 and 11.

Rotatable shaft 12 is also provided with a radial flange 46 between impeller 42 and tubular flange 21. Radial flange 46 has bearing surfaces 47, 48 on opposite faces thereof so that the radial flange 46 serves as a thrust collar. Cooperating with thrust collar 46 is an annular stationary fluid pressure thrust bearing 50 of U-shaped axial cross section defining an annulus in which thrust collar 46 rotates. One radially extending annular leg 51 of thrust bearing 50 defines a plurality of three or more arcuately spaced fluid pressure chambers 53 open to face 47 of the thrust collar. The other radially extending annular leg 52 defines a plurality of three or more arcuately spaced fluid pressure chambers 54 open to the other face 48 of the thrust collar. These arcuately spaced fluid pressure chambers 53, 54 may be defined by chambers or pockets in the radial faces of the legs or, as shown, by annular plates 55, 56 containing pie shaped pockets or chambers with the plates suitably secured to the legs. Each chamber has an orifice 57 limiting the flow of fluid therethrough to insure fluid supply under pressure to all of the chambers. Impeller 42 supplies fluid under pressure to the thrust collar bearing from supply passages 40. Fluid is discharged from the radially outer edges or lips of the pressure chambers of the thrust bearing through exit ports 58 to discharge passages 44 back to impeller 42.

The thrust bearing absorbs axial thrust forces acting on shaft 12 tending to cause axial distortion of the shaft and impeller. The thrust bearing also stabilizes the shaft in axial alignment. Any unbalance in radial forces tending to tilt the shaft will cause loss of pressure on one side of the thrust collar in a chamber 53 and increase in pressure in another chamber 53 tending to restore the thrust collar to its normal position. Similarly, there will be loss of pressure on the other side of the thrust collar in a chamber 54 and increase in pressure in another chamber 54 tending to restore the thrust collar to its normal position. For a chamber 53 on one side of the thrust collar having a loss of pressure due to the tilting of the shaft, the chamber 54 substantially opposite on the other side of the thrust collar will have an increase in fluid pressure tending to prevent tilting and tending to restore the shaft to its normal position.

In the operation of the pump, the shaft 12 is rotated by any suitable means, and during the first few revolutions on starting, there may be metallic contact of the rotating bearing surfaces and the lips of the pressure chambers of the stationary bearings. The engaging portions of the bearing surfaces and of the lips of the pressure chambers may be hardened or made of suitable nongalling material to reduce wear due to frequent starting of the pump. Impeller 42 builds up a working pressure on the fluid which journals bearing surfaces of tubular flange 21 to floatingly support the bearing surfaces between the inner and outer fluid bearings. Similarly, the fluid floatingly supports against axial forces the thrust collar in the annulus between fluid pressure chambers on opposite faces thereof.

When a bearing surface moves away from the lips of its associated fluid bearing chamber, fluid escapes freely from the chamber limited only by the restriction orifice, and the pressure in the chamber decreases. Oppositely, when a bearing surface moves toward one of the chamber lips, the fluid leakage out of that chamber decreases and the fluid pressure in that chamber increases. This increased pressure opposes the change and tends to restore the equilibrium or floating position of the rotating bearing surfaces. The restoring force is absent when the chambers have equal pressure.

Although but one embodiment of the invention has been shown and described, it will be obvious to one skilled in the art that changes and modifications may be made therein without departing from the spirit of the invention or from the scope of the appended claims.

It is claimed and desired to secure by Letters Patent:

1. In a machine the combination comprising a rotatable member having a shaft and a tubular flange coaxial with and radially spaced from said shaft, said flange having bearing surfaces on opposite faces thereof, an annular stationary bearing of U-shaped axial cross section defining an annulus in which said flange rotates, one leg of said U-shaped bearing having a plurality of pressure chambers open to one of said bearing surfaces of said flange, the other leg having a plurality of pressure chambers open to the other of said bearing surfaces of said flange, and means supplying fluid under pressure to each of said pressure chambers for maintaining said rotatable member in fixed axial alignment.

2. In a machine the combination comprising a rotatable member, a shaft and a tubular flange coaxial with and radially spaced from said shaft, said flange presenting radially outer bearing surface and a radially inner bearing surface, stationary bearing means defining a plurality of pressure chambers open to said outer and inner bearing surfaces, fluid supply means conducting fluid under pressure to each of said pressure chambers for supporting and centering said rotatable member, and fluid return means for conducting fluid from each of said pressure chambers.

3. In a centrifugal pump for a working fluid, the combination comprising a casing for containing said fluid, a rotatable shaft, a centrifugal impeller mounted on said shaft in said casing, said impeller having an annular portion extending axially over said shaft, said annular portion presenting a radially outer bearing surface and a radially inner bearing surface, said casing including means forming an annular sealing ring adjacent said outer surface adjacent said impeller to prevent fluid discharged by said impeller from flowing axially along said shaft, stationary bearing means mounted in said casing forming a plurality of pressure chambers circumferentially positioned adjacent said outer bearing surface and also forming a plurality of pressure chambers circumferentially positioned adjacent said inner bearing surface, said pressure chambers presenting open sides to said bearing surfaces, means supplying fluid under pressure to said pressure chambers to cause the fluid pressure in said chambers to support, center and axialy align said shaft and impeller in said casing, and pressure reducing means in the supply means to each chamber.

4. In a device the combination of a rotatable member including an axially extending tube presenting a radially outer cylindrical bearing surface and a radially inner cylindrical bearing surface, a stationary bearing defining an annular space with said tube disposed therein, said stationary bearing defining a plurality of pressure chambers open to said outer bearing surface of said tube and a plurality of pressure chambers open to said inner bearing surface of said tube, fluid supply means separately conducting fluid under pressure to each of said pressure chambers to maintain fluid between said stationary bearing and said outer and inner bearing surfaces of said tube, pressure reducing means in each of said supply means to cause said fluid to support said tube in a floating state, whereby radial displacement of said tube causes fluid pressure buildup in one of said pressure chambers open to the outer surface of said tube and in the diametrically opposite pressure chamber open to the inner surface of said tube tending to maintain the annular shape of said tube and keep it centered on its axis of rotation.

5. In a device the combination including a rotatable member having an axially extending tube presenting a radially outer bearing surface and a radially inner bearing surface, a stationary bearing defining an annular space with said tube disposed coaxially therein, said stationary bearing defining axially spaced apart sets of circumferentially spaced pressure chambers open to said outer bearing surface of said tube and axially spaced apart sets of circumferentially spaced pressure chambers open to said inner bearing surface of said tube, fluid supply means separately conducting fluid under pressure to each of said pressure chambers to maintain fluid between said stationary bearing and said outer and inner bearing surfaces of said tube, pressure reducing means in each of said supply means to cause said fluid to support said tube in a floating state, whereby radial displacement of said tube causes fluid pressure buildup in axially adjacent said pressure chambers open to the outer surface of said tube and in the diametrically opposite pressure chambers open to the inner surface of said tube tending to maintain said tube round and keep it centered on its axis of rotation.

6. In a device including a centrifugal pump for a working fluid, the combination comprising: a casing for containing said working fluid, a shaft journaled within said casing and having a rotatable centrifugal impeller mounted thereon for cooperating with said fluid, a tubular flange rigidly connected to said shaft and said impeller, said flange extending coaxially with said shaft and radially spaced therefrom to present a radially outward bearing surface and a radially inward bearing surface, a stationary bearing supported by said casing coaxial with said shaft, said bearing defining a plurality of circumferentially spaced pressure chambers open to said outer and said inner bearing surfaces of said flange, fluid supply means conducting fluid under pressure to each of said pressure chambers to maintain fluid on said outer and said inner bearing surfaces, means controlling the return of said fluid from said pressure chambers to said supply means to cause said pressure chambers to produce forces to maintain said shaft and said impeller coaxial with said bearing.

7. In a device including a centrifugal pump for a working fluid, the combination comprising: a casing for containing a working fluid, a shaft journaled within said casing and having a rotatable centrifugal impeller mounted thereon for cooperating with said fluid, a tubular flange rigidly connected to said shaft and said impeller, said flange extending coaxially with said shaft and radially spaced therefrom to present a radially outward bearing surface and a radially inward bearing surface, a stationary bearing of anular U-shaped axial cross section supported within said casing coaxial with said shaft, said bearing defining axially spaced apart sets of circumferentially spaced pressure chambers open to said outer and said inner bearing surfaces of said tubular flange, fluid supply means conducting fluid under pressure to each of said pressure chambers to maintain fluid on said outer and said inner bearing surfaces, means controlling the return of said fluid from said pressure chambers to said supply means to cause fluid in said pressure chambers to produce forces to maintain said shaft and said impeller coaxial with said bearing.

References Cited in the file of this patent

UNITED STATES PATENTS

| 1,146,079 | Krogh | July 13, 1915 |
| 2,393,691 | Karassik | Jan. 29, 1946 |
| 2,578,711 | Martellotti | Dec. 18, 1951 |

FOREIGN PATENTS

| 768,059 | France | July 31, 1934 |